United States Patent
Takaoka et al.

(10) Patent No.: US 6,991,054 B2
(45) Date of Patent: Jan. 31, 2006

(54) HYBRID-VEHICLE DRIVE SYSTEM WITH TORQUE INCREASING DEVICE AND DRIVING METHOD THEREOF

(75) Inventors: Toshifumi Takaoka, Susono (JP); Masakiyo Kojima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/270,670

(22) Filed: Oct. 16, 2002

(65) Prior Publication Data

US 2003/0075368 A1 Apr. 24, 2003

(30) Foreign Application Priority Data

Oct. 22, 2001 (JP) ....................... 2001-323924

(51) Int. Cl.
*B60K 1/00* (2006.01)

(52) U.S. Cl. .................. 180/65.2; 180/65.6; 477/3
(58) Field of Classification Search ......... 180/65.2, 180/65.3, 65.4, 65.6; 123/3; 477/2, 3, 5, 6, 477/7
See application file for complete search history.

(56) References Cited

U.S. PATENT DOCUMENTS

| 5,722,502 | A | | 3/1998 | Kubo |
| 5,775,449 | A | | 7/1998 | Moroto et al. |
| 5,895,333 | A | * | 4/1999 | Morisawa et al. ............. 475/5 |
| 5,934,395 | A | * | 8/1999 | Koide et al. ............... 180/65.2 |
| 5,982,045 | A | | 11/1999 | Tabata et al. |
| RE36,678 | E | * | 5/2000 | Moroto et al. ............. 180/65.4 |
| 6,146,302 | A | * | 11/2000 | Kashiwase ..................... 475/5 |
| 6,203,468 | B1 | * | 3/2001 | Nitta et al. .................... 477/5 |
| 6,490,945 | B2 | * | 12/2002 | Bowen ........................ 74/339 |
| 6,638,022 | B2 | * | 10/2003 | Shimabukuro et al. ........ 417/2 |
| 6,692,405 | B2 | * | 2/2004 | Minowa et al. ............... 477/5 |
| 6,724,100 | B1 | * | 4/2004 | Gabriel ....................... 307/9.1 |

FOREIGN PATENT DOCUMENTS

| JP | 07-336810 | 12/1995 |
| JP | 09-046821 | 2/1997 |
| JP | 10-002241 | 1/1998 |
| JP | A 11-198669 | 7/1999 |
| JP | A 2000-324615 | 11/2000 |

* cited by examiner

*Primary Examiner*—Christopher P. Ellis
*Assistant Examiner*—Brian Swenson
(74) *Attorney, Agent, or Firm*—Oliff & Berridge, PLC

(57) ABSTRACT

In a hybrid vehicle drive system, an output shaft of an internal combustion engine is connected to a first motor generator and a wheel drive shaft through a power distribution mechanism, and the wheel drive shaft is connected to a second motor generator. The hybrid vehicle drive system is provided with a device that increases the torque of the wheel drive shaft separately from the second motor generator when the internal combustion engine is cranked by the first motor generator.

26 Claims, 9 Drawing Sheets

HYBRID-VEHICLE DRIVE SYSTEM WITH TORQUE INCREASING DEVICE AND DRIVING METHOD THEREOF

INCORPORATION BY REFERENCE

The disclosure of Japanese Patent Application No. 2001-323924, filed on Oct. 22, 2001, including the specification, drawings and abstract is incorporated herein by reference in its entirety.

BACKGROUND OF THE INVENTION

1. Field of Invention

The invention relates to improvements in cranking performance of a hybrid-vehicle (HV) drive system that drives wheels using an internal combustion engine and an electric motor or motors in combination.

2. Description of Related Art

As reducing air pollution and conserving fuel resources have become important issues in recent years, hybrid vehicles, operated by driving wheels using a combination of an internal combustion engine and an electric motor or motors, have attracted much attention. Japanese Laid-open Patent Publication No.11-198669 discloses a hybrid-vehicle drive system. In the system, a first motor-generator is connected in series to a crankshaft of an internal combustion engine so as to constitute a power shaft which is driven by the internal combustion engine and/or the first electric motor-generator as a motor. The power shaft and an output shaft of a second motor-generator are respectively connected to a ring gear and a sun gear of a planetary gear mechanism. A carrier of the planetary gear mechanism is connected to a transmission, thus serving as an output shaft. The above-structured hybrid vehicle drive system allows the motor generator to directly drive the crankshaft of the internal combustion engine by simply applying electric current to the first motor generator. As a result, cranking of the internal combustion engine can be easily performed.

Another hybrid-vehicle drive system has been proposed which is devised of transmission that has generally been required to be disposed between an output shaft of an internal combustion engine and a vehicle axle. In this drive system, an electric motor is adapted to differentially absorb differences in the rotating speed between an output shaft of an internal combustion engine and a vehicle axle. The differences are caused by a variance between the drive torque with respect to the rotating speed required for the vehicle wheel and that obtained from the internal combustion engine. The aforementioned drive system of the hybrid vehicle is schematically shown in FIG. 1.

Referring to FIG. 1, an internal combustion engine 1 is mounted on a vehicle body (not shown). An output shaft or a crankshaft 2 of the internal combustion engine 1 is connected to a carrier 7 of a planetary gear mechanism 3 including a sun gear 4, a ring gear 5, and planetary pinions 6. A first motor-generator (MG1) 8 includes a coil 9 and a rotor 10. The rotor 10 is connected to the sun gear 4 while the coil 9 is supported on the vehicle body. One end of a propeller shaft 11 is connected to the ring gear 5. The planetary gear mechanism 3 serves as a power distribution mechanism so as to distribute power generated by the internal combustion engine via the crankshaft 2 into the planetary gear mechanism 8 and the propeller shaft 11 serving as a main part of a wheel-drive shaft. A second motor-generator (MG2) 12 is connected to an intermediate portion of the propeller shaft 11. The second motor-generator 12 includes a coil 13 supported on the vehicle body and a rotor 14. In the drive system shown in FIG. 1, for example, the rotor 14 is connected to the propeller shaft 11 by engaging a gear 16 rotatably supported on the rotor 14 to a gear 15 of the propeller shaft 11. However, the connection between the rotor 14 and the propeller shaft 11 may be made in an arbitrary manner. The other end of the propeller shaft 11 is connected to a pair of vehicle axles 18 via a differential 17. A wheel 19 is attached to each vehicle axle 18.

In the drive system shown in FIG. 1, as the crankshaft 2 and the carrier 7 rotate synchronously, the rotating speed of the crankshaft 2 and the carrier 7 is designated as "Vc." As the motor-generator 8 and the sun gear 4 rotate synchronously, the rotating speed of the motor-generator 8 and the sun gear 4 is designated as "Vs". The ring gear 5, the second electric motor-generator 12, and the wheels 19 rotate relative to one another, each of which corresponds to the vehicle speed. The rotating speeds of each of the ring gear 5, the second motor generator 12 and the wheels 19 differ depending on a ratio of the number of gear teeth of the gear 15 to that of the gear 16, a speed reducing ratio at the differential 17, and diameter of tire. However, in the following description, the rotating speed of the ring gear 5 will be represented as the rotating speed of these elements and designated as "Vr" for convenience.

FIG. 2 shows the relationship among the rotating speed Vc of the internal combustion engine and the rotating speeds Vs, Vr of the two motor generators MG1, MG2 in the drive structure for the hybrid vehicle with the internal combustion engine and two motor-generators combined with the planetary gear mechanism. The rotating speed Vs is derived from the following equation:

$$Vs = (1 + 1/\rho)Vc - (1/\rho)Vr$$

where $\rho$ represents the number of gear teeth of the sun gear relative to that of the ring gear ($\rho < 1$), Vc is determined based on the rotating speed of the internal combustion engine and Vr is determined based on the vehicle speed.

Supposing that each torque at the carrier, the sun gear, and the ring gear is designated as Tc, Ts, and Tr, respectively, each torque is equilibrated as follows:

$$Ts:Tc:Tr = \rho/(1+\rho) : 1 : 1/(1+\rho)$$

When any of these elements generates or absorbs the torque, the torque is transferred among those elements until the above relationship is equilibrated.

In the hybrid vehicle including the drive system structured as described above, operations of the internal combustion engine, MG1 and MG2 are controlled by a controller (not shown) based on operational commands given from an operator or a driver and the operating state of the vehicle. More specifically, the controller includes a microcomputer for calculating a target vehicle speed and a target wheel drive torque on the basis of a vehicle operational command issued by the operator and the operating state of the vehicle represented by detection signals of various sensors. The controller also calculates the output current available at a power storage system or the quantity of power required to be generated and supplied to the power storage system based on a charging state of the power storage system. The controller further determines a required operating mode of the internal combustion engine including a suspension state and a required operating mode or power generating mode of MG1 and MG2. The respective operation of the internal combustion engine, MG1 and MG2 is controlled on the basis of the calculated results.

In the above-structured hybrid vehicle drive system, each value of the rotating speed Vc of the internal combustion engine and the rotating speed Vr corresponding to the vehicle speed, and correlation between the respective values can be changed to a greater extent if the change in those values can be absorbed by the rotating speed Vs of MG1. This is why the hybrid vehicle drive system to operate to operate without a transmission. More specifically, the relationship between the rotating speeds Vc and Vr can be freely changed by adjustment of the power distribution mechanism. The hybrid vehicle drive system allows the engine to be operated (Vc>0) even when the vehicle is stopped, and allows the engine to be stopped (Vc=0) even when the vehicle runs ahead (Vr>0). The hybrid vehicle drive system also allows the vehicle to be reversely operated (Vr<0) even when the engine is operated or stopped (Vc≧0).

The rotating speed of MG2 changes depending on the vehicle speed. The charging state of the power storage system is essentially unrelated to the vehicle speed. Therefore, it is difficult to use MG2 as a power generator for charging the power storage system. MG1 mainly serves to charge the power storage system whereas MG2 mainly serves to drive the wheels of the hybrid vehicle.

In the above structured hybrid vehicle drive system shown in FIG. 1, upon start of the internal combustion engine, electricity is applied to MG1 irrespective of whether the vehicle is stopped (Vr=0) or running (Vr>0). Then MG1 is operated in a forward direction until the rotating speed Vs reaches a predetermined value in accordance with the value of the rotating speed Vr such that the engine speed Vc is increased to a speed that allows autonomous start-up of the internal combustion engine.

Assuming that the line connecting Vs, Vc, and Vr in FIG. 2 is compared to a piece of lever, one end of the lever, that is, Vr has to be supported on its lower side so as to raise the point corresponding to the Vc against cranking of the internal combustion engine by raising the other end of the lever, that is, Vs. Vr is supported on its lower side mainly by the torque in the forward driving direction generated by MG2. The cranking support torque may cause insufficiency in the driving torque generated by MG2 for operating the vehicle by driving the axle. Sufficient driving torque can be obtained by increasing the capacity of MG2. However, such capacity increase leads to a cost increase. If MG2 fails to generate sufficient cranking support torque, the cranking torque is transferred to the wheels, thus generating vibration in the vehicle body. As described above, there are various disadvantages of the generally employed drive system in which MG2 mainly serves to generate the cranking torque.

SUMMARY OF THE INVENTION

It is an object of the invention to provide an improved structure for a hybrid-vehicle drive system.

A driving system for a hybrid vehicle including an internal combustion engine, a first motor generator, and a second motor generator is provided with a power distribution device through which an output shaft of the internal combustion engine is connected to the first motor generator and a wheel drive shaft of the hybrid vehicle. The wheel drive shaft is connected to the second motor generator, and a torque increasing device that increases a torque of the wheel drive shaft separately from the second motor generator so as to support cranking of the internal combustion engine performed by the first motor generator via the power distribution device.

The term "motor-generator" literally represents a device having functions of both a motor and an electric generator. The invention relates to a driving performance of a hybrid vehicle drive system on a short term basis, in which the output shaft of the internal combustion engine is connected to the first motor-generator and the wheel-drive shaft via the power distribution mechanism, and the second motor-generator is connected to the wheel-drive shaft. In other words, the invention is not related to a driving performance of a hybrid vehicle drive system on a long term basis, in which driving of the internal combustion engine, motor drive operation, and charging operation of the power storage system are correlated. Therefore the first and the second motor-generators may be formed as electric motors. Generally, the actual vehicle drive system only employs the second motor generator as the motor (however, it can serve as the power generating device). The first electric motor-generator has to have a power generating function so as to constitute the vehicle driving system that is available on a long term basis. The motor generator, thus, may not have a power generating function but an electric motor only.

The torque increasing device may be a brake that restrains rotation of the wheel drive shaft during cranking of the internal combustion engine. Further the brake may be a one-way brake that allows the wheel drive shaft to rotate in a first rotating direction in which the wheel is driven forward, and prevents the wheel drive shaft from rotating in a second rotating direction that is opposite to the first rotating direction.

The torque increasing device may be a lock-up device that locks up the power distribution device during the cranking of the internal combustion engine.

The driving system for a hybrid vehicle is provided with a clutch on an intermediate portion of the wheel drive shaft, the clutch dividing the wheel drive shaft into a first portion close to the torque increasing device and a second portion close to the wheels.

The second motor generator is connected to a point on the second portion of the wheel drive shaft.

The clutch may be a one-way clutch that connects the first portion to the second portion when the first portion rotates in a first rotating direction in which the wheels are driven to drive the wheels forward with respect to the second portion, and prevents the second portion from rotating with respect to the first portion in the second rotating direction opposite to the first rotating direction.

A function of the clutch is obtained by a clutch function of a transmission provided on the wheel drive shaft of the hybrid vehicle.

In a driving method of an internal combustion engine of a hybrid vehicle including a first motor generator, a second motor generator and a power distribution device, an output shaft of the internal combustion engine is connected to the first motor generator and a wheel drive shaft via the power distribution device, the second motor generator is connected to the wheel drive shaft, and a transmission is disposed on an intermediate point of the wheel drive shaft such that the internal combustion engine is started in a stopped state of the hybrid vehicle. In the driving method, the transmission is set to a high gear, and the internal combustion engine is cranked using the first motor generator through the power distribution device.

According to the aforementioned embodiment of the invention, if a device that increases the cranking support torque of the wheel drive shaft is provided in addition to the second motor-generator when the internal combustion engine is cranked by the first motor generator via the power distribution mechanism, the second motor generator does not have to bear the burden of generating the cranking support torque. Even when the engine is cranked during operation of the vehicle driven by the second motor generator, sufficient torque for driving the vehicle can be supplied from the second motor generator. Moreover the cranking torque is not transferred to the wheels via the second motor-generator, preventing deterioration in the riding comfort.

It is important that, when the internal combustion engine is cranked, the cranking support torque is increased by a device other than the second motor generator that drives the axle using the brake that restrains rotation of the wheel drive shaft at cranking of the internal combustion engine and a lock-up of the power distribution mechanism.

The one-way brake that allows rotation of the wheel drive shaft in the first rotating direction for driving the wheel forward and prevents rotation of the wheel drive shaft in the second rotating direction opposite to the first rotating direction may be employed. In this case, such a one-way brake can be automatically operated to support the cranking torque for cranking the internal combustion engine without interfering with normal operation of the wheel driven by the internal combustion engine.

The clutch disengages the second portion from the first portion by operating the device for increasing the cranking support torque for cranking the engine so as to prevent transfer of the fluctuation in cranking torque to the wheels.

When the second motor generator is connected to the wheel drive shaft at the second portion by the clutch, the wheels can be driven by the second motor generator alone, without any problem. The clutch may be formed as the one-way clutch in which the second portion is connected to the first portion for the purpose of rotating the first portion in the first rotating direction with respect to the second portion such that the wheels are driven forward, and the second portion is allowed to rotate with respect to the first portion in the second rotating direction opposite to the first rotating direction. Upon cranking of the internal combustion engine, the second portion connected to the wheel can become irrespective of fluctuation in the cranking torque.

In the case where the transmission is disposed on an intermediate portion of the wheel-drive shaft, the clutch function of the transmission can be used for dividing the wheel-drive shaft into a first portion located near the torque increasing device for increasing the cranking support torque and a second portion located near the wheels.

The aforementioned transmission is shifted to a high gear to start the internal combustion engine in a stopped state of the vehicle such that the transmission is used as the device for increasing the cranking support torque. When the value of the high gear ratio is 1, the transmission itself cannot be utilized as the torque increasing device for increasing the cranking support torque. However, in the case where the transmission is disposed on an intermediate point of the wheel-drive shaft, the reduction gear ratio of the differential may be smaller than that obtained when no transmission is provided when the maximum possible required wheel torque is kept equal. Therefore, the transmission disposed on the wheel-drive shaft may increase the cranking support torque acting on the power delivery mechanism during direct connection to the transmission compared with the case in which no transmission is provided.

DETAILED DESCRIPTION OF PREFERRED EMBODIMENTS

Figure 1:
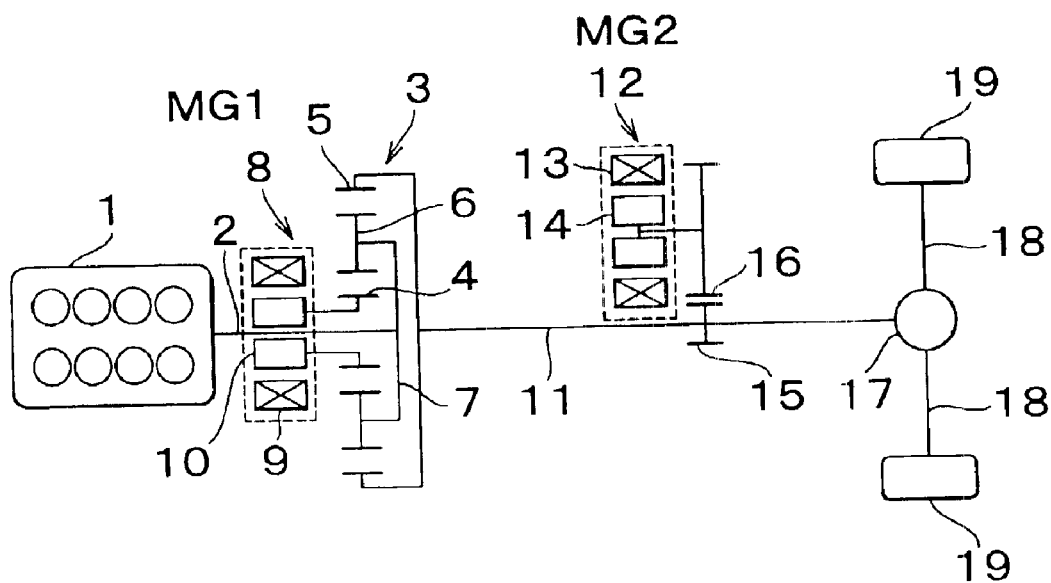
FIG. 1 is a schematic view illustrating the construction of a conventional hybrid-vehicle drive system.
Figure 2:
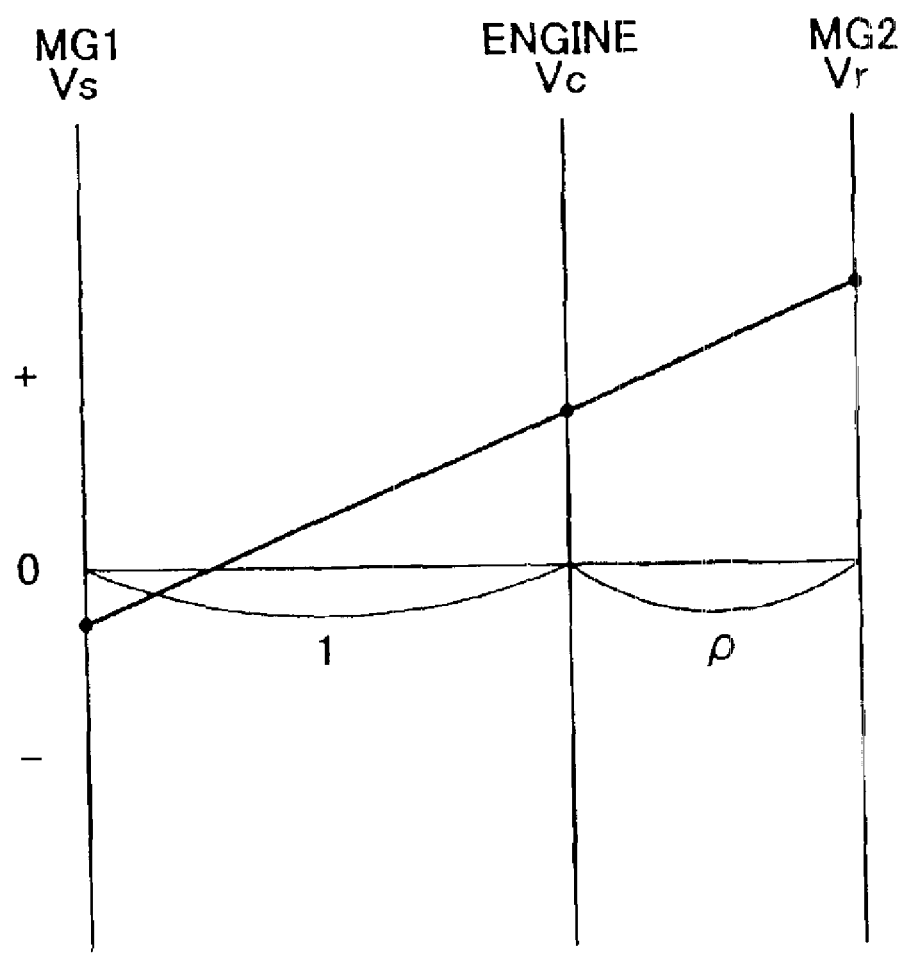
FIG. 2 is a graph illustrating a relationship among a rotation speed Vc of an internal combustion engine, a rotation speed Vs of an electric motor-generator MG1 and a rotation speed Vr of another electric motor-generator MG2.
Figure 3:
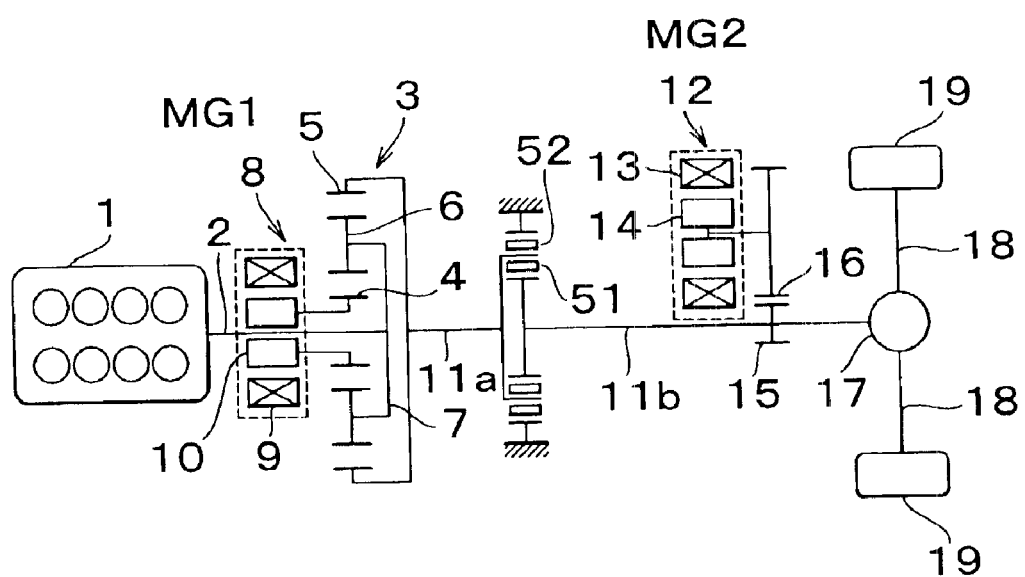
FIG. 3 is a schematic view illustrating the construction of a hybrid-vehicle drive system according to a first embodiment of the invention.

The foregoing and/or further objects, features and advantages of the invention will become more apparent from the following description of preferred embodiments with reference to the accompanying drawings, in which like numerals are used to represent like elements and wherein:

FIG. 3 is a schematic view of a first embodiment of the hybrid vehicle driving system as shown in FIG. 1 in which an output shaft 2 of an internal combustion engine 1 is connected to a first motor-generator 8 and a wheel-drive shaft 11 via a power distribution mechanism 3 and a second motor-generator 12 is connected to the wheel-drive shaft 11 as in the drive system shown in FIG. 1. The drive system is provided with a torque increasing device that increases the cranking torque during cranking of the internal combustion engine 1 apart from the second motor-generator 12. Referring to FIG. 3, elements that are the same as or equivalent to those shown in FIG. 1 are denoted by the same reference numerals and characters. The drive system in accordance with the embodiment is provided with a clutch 51 at an intermediate portion of the wheel-drive shaft 11. The clutch 51 divides the wheel-drive shaft 11 into a first portion located near the cranking support torque increase device and a second portion located near the vehicle wheels 19.

Referring to FIG. 3, a propeller shaft 11 as a part of the wheel-drive shaft 2 is divided at an intermediate point located closer to the internal combustion engine 1 than a gear 15 to which the motor-generator MG2 12 is connected. More specifically, the propeller shaft 11 is divided into a first portion 11a located closer to the internal combustion engine 1 and a second portion 11b located farther from the internal combustion engine 1. Those portions 11a and 11b can be engaged or disengaged by a clutch 51. A brake 52 selectively restricts the rotation of the first portion 11a.

When the internal combustion engine is cranked by operating MG1 8 as an electric motor, the brake 52 is engaged to restrict rotation of the first portion 11a so as to restrict rotation of the ring gear 5 of the power distribution mechanism 3. As a result, the reactive support is obtained at the ring gear 5 such that the internal combustion engine can be cranked by MG1 via the power distribution mechanism 3. The brake 52 that restricts the rotation of the first portion 11a may prevent transfer of fluctuations in the cranking torque to the vehicle body in the form of vibrations. Disengagement of the clutch 51 may further prevent transfer of the fluctuations in the cranking torque to the wheels via the second portion 11b. The clutch 51 is disengaged upon start of the internal combustion engine 1 so as to perform cranking in a constant mode irrespective of the running state of the vehicle.

Figure 4:
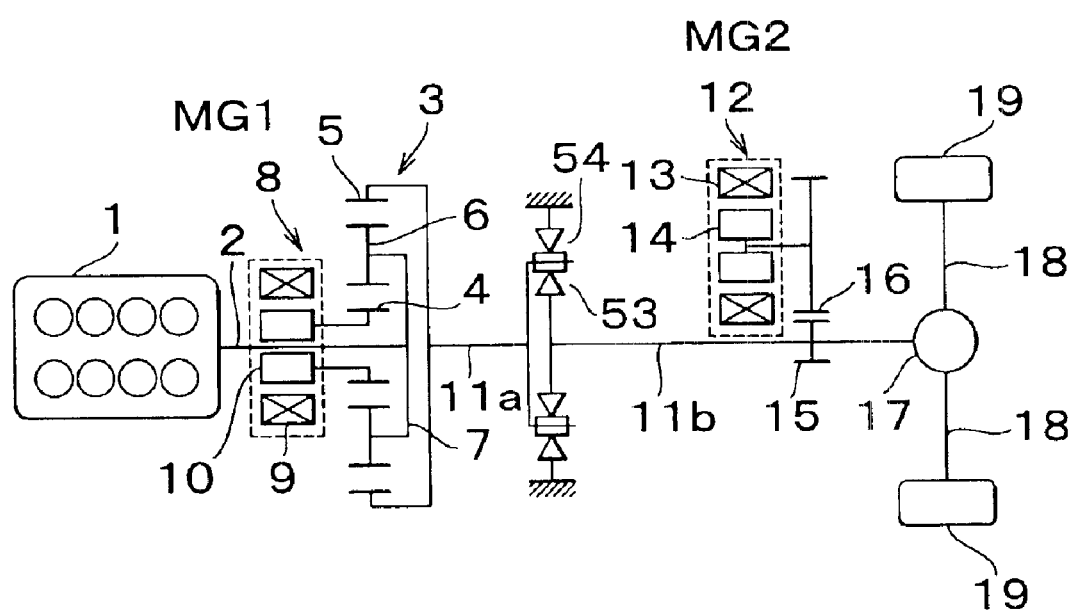
FIG. 4 is a schematic view illustrating the construction of a hybrid-vehicle drive system according to a second embodiment of the invention.

FIG. 4 is a view schematically showing a second embodiment of the invention in which the clutch 51 and the brake 52 of the drive system shown in FIG. 3 are replaced by a one-way clutch 53 and a one-way brake 54, respectively. In FIG. 4, elements that are the same as or equivalent to those shown in FIG. 1 are denoted by the same reference numerals and characters. When it is assumed that the internal combustion engine 1 is operated to rotate the output shaft 2 clockwise as viewed from the left side of FIG. 4, the ring gear 5 is driven counterclockwise as viewed from the left side of FIG. 4 by the reaction force generated by MG1 8 for cranking the internal combustion engine 1. When the one-way brake 54 is structured to prevent the first portion 11a of the wheel-drive shaft 11 from rotating in its rotating direction, the first portion 11a is allowed to rotate along the rotating direction of the internal combustion engine 1, and the reaction support required for the ring gear 5 is obtained only when MG1 8 is operated to crank the internal combustion engine 1. The one-way clutch 53 is engaged when the first portion 11a is about to rotate clockwise as viewed from the left side of FIG. 4 with respect to the second portion 11b, and allows rotation of the second portion 11b counterclockwise viewed from the left side with respect to the first portion 11a such that the can be driven by the internal combustion engine 1 and/or MG1 8 in the forward direction. In the above case, the wheel can be driven in the reverse direction by MG2 12. Therefore, even when rotation of the first portion 11a in the reverse direction is blocked by the one-way brake 54, the rotation of the second portion 11b in the reverse direction is allowed by the one-way clutch 53.

Figure 5:
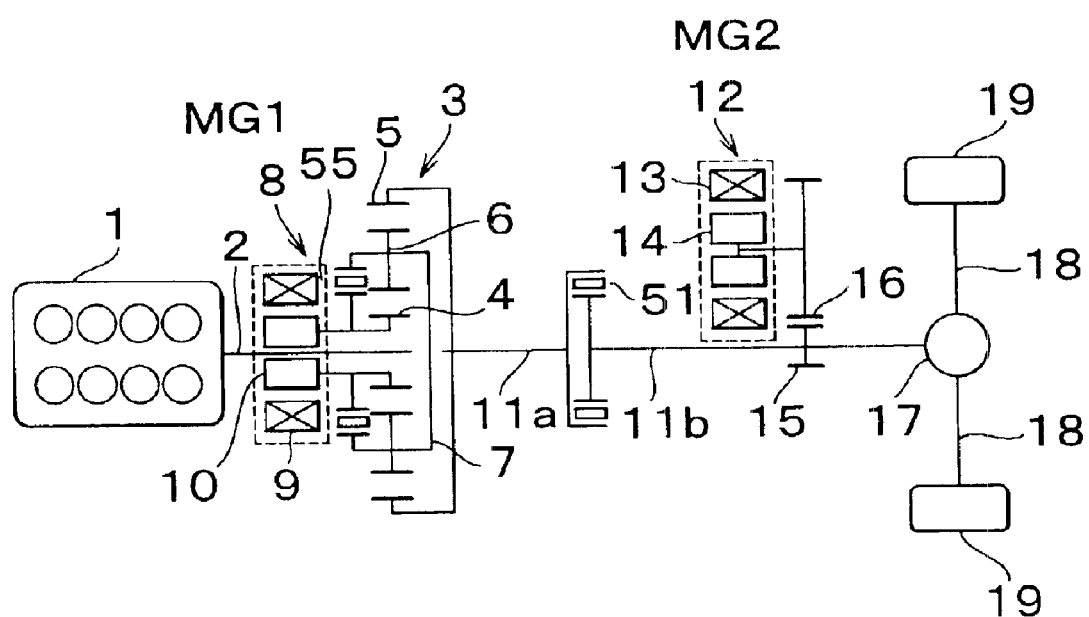
FIG. 5 is a schematic view illustrating the construction of a hybrid-vehicle drive system according to a third embodiment of the invention.

FIG. 5 is a view schematically showing a third embodiment of the invention. In FIG. 5, elements that are the same as or equivalent to those shown in FIG. 1 are denoted by the same reference numerals and characters. In this embodiment, the wheel-drive shaft 11 is divided into the first portion 11a and the second portion 11b with the clutch 51 interposed therebetween as in the embodiment shown in FIG. 3. In the third embodiment, the sun gear 4 and the carrier 6 of the power distribution mechanism 3 are arranged to be selectively connected to each other by a clutch 55 so as to lock up the power distribution mechanism 3. With this arrangement, when the power distribution mechanism 3 is locked up by engaging the clutch 55, the drive torque generated by MG1 8 can be transferred to the internal combustion engine 1 so as to be cranked by MG1 8. Meanwhile, disengagement of the clutch 51 upon cranking of the internal combustion engine 1 may prevent fluctuations in the cranking torque from being transferred to the wheels 19 through the wheel-drive shaft. Here, the clutch 51 can be replaced by the one-way clutch 53 used in the second embodiment shown in FIG. 4.

Figure 6:
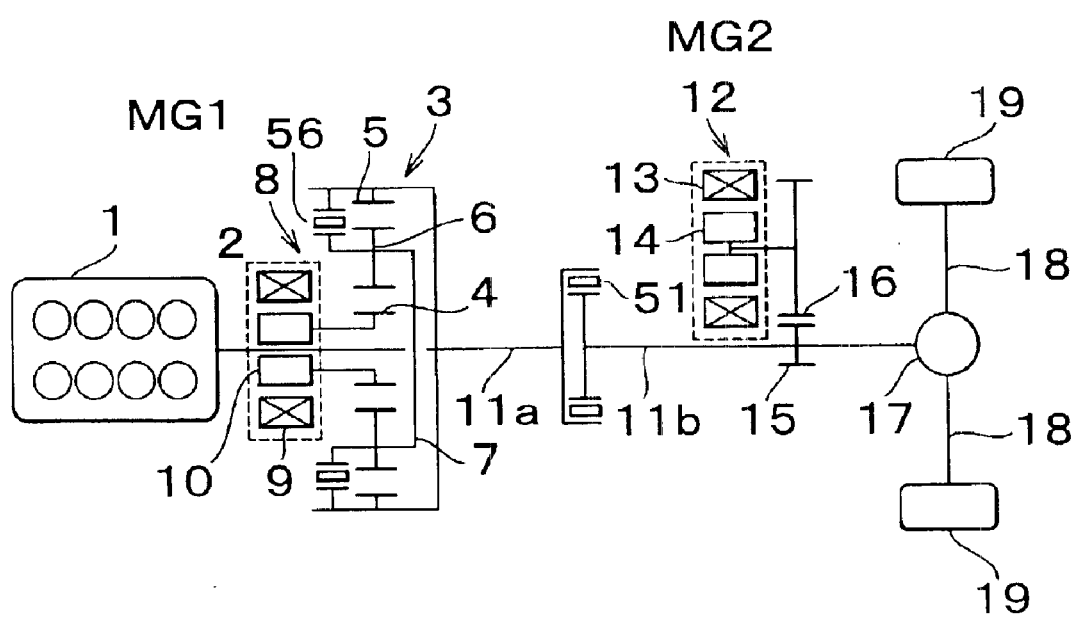
FIG. 6 is a schematic view illustrating the construction of a hybrid-vehicle drive system according to a forth embodiment of the invention.

FIG. 6 is a view schematically showing a fourth embodiment of the invention. In FIG. 6, elements that are the same as or equivalent to those shown in FIG. 1 are denoted by the same reference numerals and characters. In this embodiment, the wheel-drive shaft 11 is divided into the first portion 11a and the second portion 11b with the clutch 51 interposed therebetween. The ring gear 5 and the carrier 6 of the power distribution mechanism 3 are arranged to be selectively connected to each other by a clutch 56 to lock up the power distribution mechanism 3 as in the first embodiment shown in FIG. 3. With this arrangement, when the power distribution mechanism 3 is locked up by engaging the clutch 56, the drive torque from MG1 8 can be transferred to the internal combustion engine 1 so as to be cranked by MG1 8. Meanwhile, disengagement of the clutch 51 upon cranking of the internal combustion engine 1 may prevent fluctuations in the cranking torque from being transferred to the wheels 19 through the wheel-drive shaft 11. In this case, the clutch 51 can be replaced by the one-way clutch 53 used in the second embodiment shown in FIG. 4.

Figure 7:
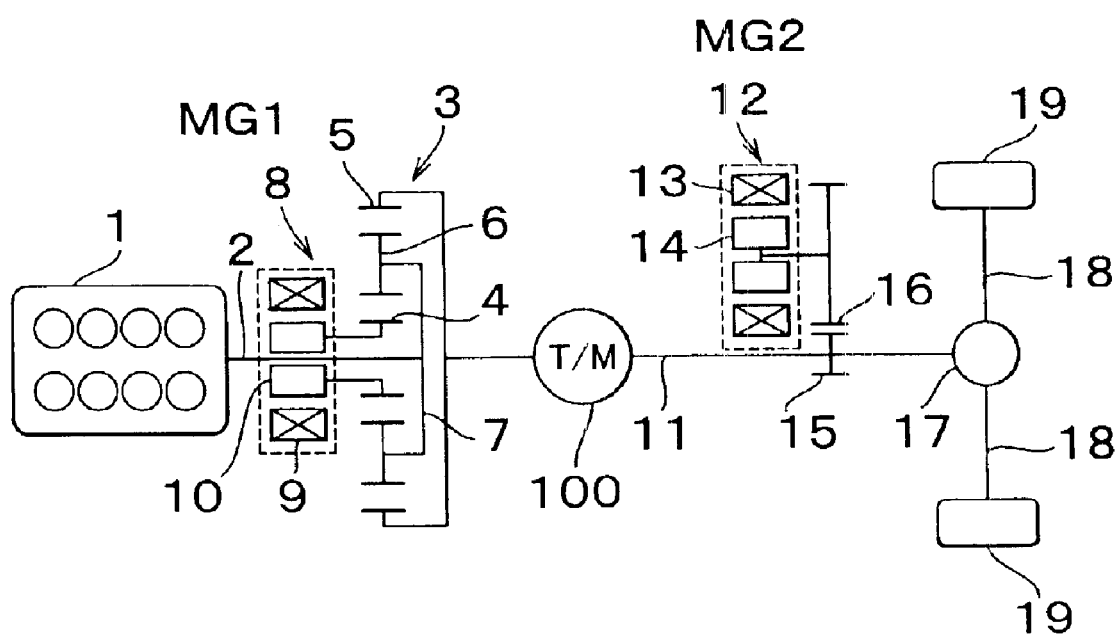
FIG. 7 is a schematic view illustrating another embodiment of the invention in which a transmission is installed in the hybrid-vehicle drive system shown in FIG. 1.
Figure 9:
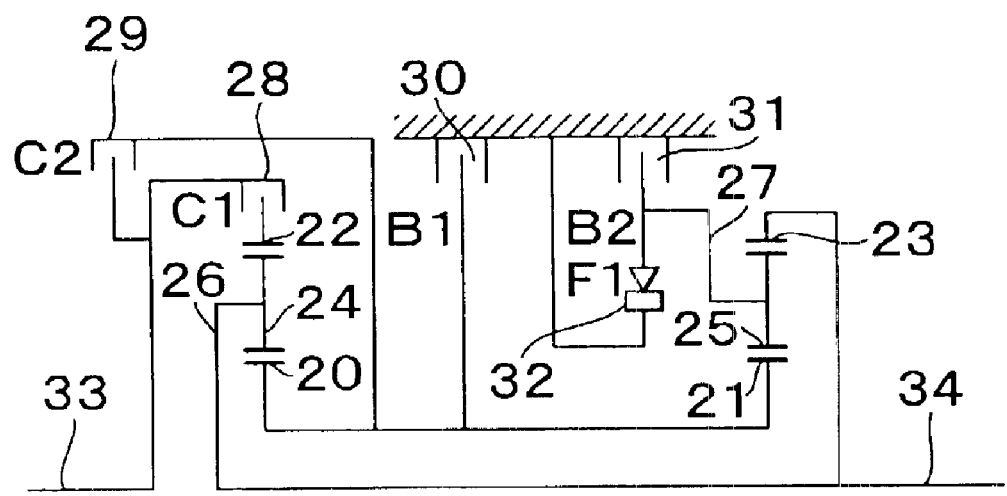
FIG. 9 is a schematic view illustrating an exemplary transmission used in the hybrid-vehicle drive systems shown in FIGS. 7 and 8.

FIG. 7 is a view schematically showing a drive system including a transmission 100 disposed on an intermediate portion of the propeller shaft 11 as in the hybrid-vehicle drive system proposed in Japanese Patent Application Laid-Open No. 2001-323578. In FIG. 7, elements that are the same as or equivalent to those shown in FIG. 1 are denoted by the same reference numerals and characters. A transmission constructed as shown in FIG. 9 may be used as the transmission 100. Referring to FIG. 9, a sun gear 20, a ring gear 22, planetary pinions 24, and a carrier 26 constitute one planetary gear mechanism. A sun gear 21, a ring gear 23, planetary pinions 25, and a carrier 27 constitute another planetary gear mechanism. The transmission includes clutches 28(C1), 29(C2), and brakes 30(B1), 31(B2), and a one-way clutch 32(F1). These rotating elements are combined so as to be connected to an input shaft 33 and an output shaft 34 as shown in FIG. 9. With the above-structured transmission, the gear is shifted to the first stage with the highest speed reducing ratio by engaging the clutch C1. The gear is shifted to the second stage with the intermediate speed reducing ratio by engaging the clutch C1 with the brake B1. The gear is shifted to the third stage with the lowest speed reducing ratio (=1) by engaging the clutch C1 with the clutch C2. The gear is shifted to the reverse stage by engaging the clutch C2 with the brake B2.

In the aforementioned drive system in which the transmission is provided on an intermediate portion of the wheel-drive shaft 11, increased torque can be obtained for driving power transferred from the power distribution mechanism 3 before cranking the internal combustion engine by shifting the gear to the higher gear, preferably the highest gear. It is well understood that various kinds of known transmission control devices are capable of shifting the gear to a predetermined higher gear easily in accordance with cranking of the internal combustion engine.

In the case where the transmission 100 is provided at an intermediate portion of the wheel-drive shaft 11, the transmission 100 may be combined with the brake 52, the one-way brake 54, the lock-up clutch 55, or 56 respectively used in the embodiments shown in FIGS. 3 to 6 by utilizing the neutral function thereof so as to become the replacement of the clutch 51 or the one-way clutch 53 in the embodiments shown in FIGS. 3 to 6.

Figure 8:
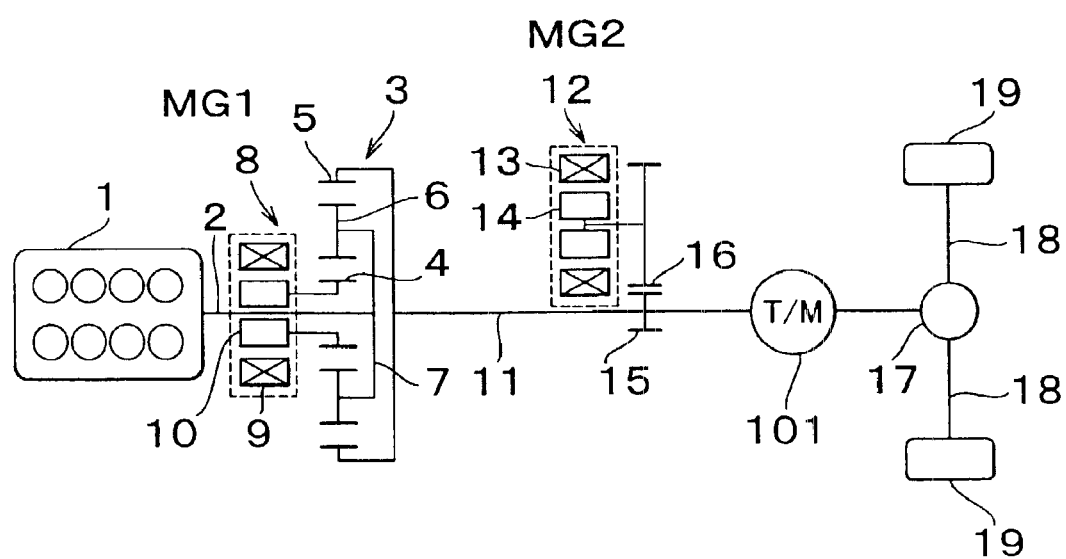
FIG. 8 is a schematic view illustrating another embodiment of the invention in which a transmission is installed in the hybrid-vehicle drive system shown in FIG. 1.

FIG. 8 is a view schematically showing another drive system in which a transmission 101 is disposed at an intermediate portion of the wheel-drive shaft 11 and located farther from the internal combustion engine 1 than MG2 12. In FIG. 8, elements that are the same as or equivalent to those shown in FIG. 1 are denoted by the same reference numerals and characters. A transmission structured as shown in FIG. 9, for example, may be used as the transmission 101. It is to be understood that the transmission 101 provides both of the above-described two functions derived from the transmission 100.

While the invention has been described in detail with reference to embodiments thereof, it is to be understood that the invention is not limited to the embodiments or constructions. To the contrary, it will be obvious to a person skilled in the art that the invention may be embodied in various manners without departing from the spirit or scope of the present invention.

What is claimed is:

1. A hybrid vehicle drive system including an internal combustion engine, a first motor generator, and a second motor generator, the system comprising:
   a power distribution device;
   an output shaft of the internal combustion engine is coupled to the first motor generator via the power distribution device, the output shaft is also coupled to a first portion of a wheel drive shaft via the power distribution device, the wheel drive shaft being connected to the second motor generator;
   a torque increasing device that increases a torque of the wheel drive shaft separately from the second motor generator so as to enhance cranking of the internal combustion engine performed by the first motor generator via the power distribution device; and
   a clutch on an intermediate portion of the wheel drive shaft, the clutch dividing the wheel drive shaft into the first portion closest to the torque increasing device and a second portion closest to the wheels, wherein:
   the second motor generator is connected to the second portion of the wheel drive shaft, and
   a function of the clutch is obtained by a clutch function of a transmission provided on the wheel drive shaft of the hybrid vehicle.

2. A hybrid vehicle drive system according to claim 1, wherein the second motor generator including a coil and a rotor, the rotor is connected to the wheel drive shaft by engaging a first gear supported on the rotor to a second gear supported on the wheel drive shaft.

3. A hybrid vehicle drive system according to claim 1, wherein the torque increasing device comprises a lock-up device that locks the power distribution device during the cranking of the internal combustion engine.

4. A hybrid vehicle drive system according to claim 1, wherein the power distribution device is constituted by the planetary gear mechanism which distributes power generated by the internal combustion engine between the first motor generator and the wheel drive shaft.

5. A hybrid vehicle drive system according to claim 4, wherein the second motor generator including a coil and a rotor, the rotor is connected to the wheel drive shaft by engaging a first gear supported on the rotor to a second gear supported on the wheel drive shaft.

6. A hybrid vehicle drive system according to claim 1, wherein the power distribution device distributes power generated by the internal combustion engine between the first motor generator and a propeller shaft.

7. A hybrid vehicle drive system according to claim 6, wherein the second motor generator including a coil and a rotor, the rotor is connected to the propeller shaft by engaging a first gear supported on the rotor to a second gear supported on the propeller shaft.

8. A hybrid vehicle drive system according to claim 6, wherein the other end of the propeller shaft is connected to a pair of vehicle axles via a differential.

9. A hybrid vehicle drive system according to claim 8, wherein the second motor generator including a coil and a rotor, the rotor is connected to the propeller shaft by engaging a first gear supported on the rotor to a second gear supported on the propeller shaft.

10. A hybrid vehicle drive system according to claim 6, wherein the power distribution device is constituted by the planetary gear mechanism which distributes power generated by the internal combustion engine between the first motor generator and the propeller shaft.

11. A hybrid vehicle drive system according to claim 10, wherein the second motor generator including a coil and a rotor, the rotor is connected to the propeller shaft by engaging a first gear supported on the rotor to a second gear supported on the propeller shaft.

12. A hybrid vehicle drive system according to claim 10, wherein the other end of the propeller shaft is connected to a pair of vehicle axles via a differential.

13. A hybrid vehicle drive system according to claim 12, wherein the second motor generator including a coil and a rotor, the rotor is connected to the propeller shaft by engaging a first gear supported on the rotor to a second gear supported on the propellor shaft.

14. A hybrid vehicle drive system according to claim 1, wherein the torque increasing device includes a brake that restrains rotations of the wheel drive shaft during cranking of the internal combustion engine.

15. A hybrid vehicle drive system according to claim 14, wherein:
   the brake is a one-way brake that allows the wheel shaft to rotate in a first rotating direction in which a wheel is driven forward, and prevents the wheel drive shaft from rotating in a second direction that is opposite to the first rotating direction, and
   the clutch comprises a one-way clutch that connects the first portion to the second portion when the first portion rotates in the first rotating direction in which the wheel is driven forward with the respect to the second portion, and prevents the second portion from rotating with respect to the first portion in the second rotating direction opposite to the first rotating direction.

16. A hybrid vehicle drive system according to claim 14, wherein the second motor generator including a coil and a rotor, the rotor is connected to the wheel drive shaft by engaging a first gear supported on the rotor to a second gear supported on the wheel drive shaft.

17. A hybrid vehicle drive system according to claim 14, wherein the power distribution device is constituted by the planetary gear mechanism which distributes power generated by the internal combustion engine between the first motor generator and the wheel drive shaft.

18. A hybrid vehicle drive system according to claim 17, wherein the second motor generator including a coil and a rotor, the rotor is connected to the wheel drive shaft by engaging a first gear supported on the rotor to a second gear supported on the wheel drive shaft.

19. A hybrid vehicle drive system according to claim 14, wherein the power distribution device distributes power generated by the internal combustion engine between the first motor generator and a propeller shaft.

20. A hybrid vehicle drive system according to claim 19, wherein the second motor generator including a coil and a rotor, the rotor is connected to the propeller shaft by engaging a first gear supported on the rotor to a second gear supported on the propeller shaft.

21. A hybrid vehicle drive system according to claim 19, wherein the the other end of the propeller shaft is connected to a pair of vehicle axles via a differential.

22. A hybrid vehicle drive system according to claim 21, wherein the second motor generator including a coil and a rotor, the rotor is connected to the propeller shaft by engaging a first gear supported on the rotor to a second gear supported on the propeller shaft.

23. A hybrid vehicle drive system according to claim 19, wherein the power distribution device is constituted by the planetary gear mechanism which distributes power generated by the internal combustion engine between the first motor generator and the propeller shaft.

24. A hybrid vehicle drive system according to claim 23, wherein the second motor generator including a coil and a rotor, the rotor is connected to the propeller shaft by engaging a first gear supported on the rotor to a second gear supported on the propeller shaft.

25. A hybrid vehicle drive system according to claim 23, wherein the other end of the propeller shaft is connected to a pair of vehicle axles via a differential.

26. A hybrid vehicle drive system according to claim 25, wherein the second motor generator including a coil and a rotor, the rotor is connected to the propeller shaft by engaging a first gear supported on the rotor to a secone gear supported on the propellor shaft.

* * * * *